US012720471B2

(12) United States Patent
Yilmaz et al.

(10) Patent No.: US 12,720,471 B2
(45) Date of Patent: Aug. 25, 2026

(54) POSITIONING SIGNAL MANAGEMENT IN SIDELINK CAPABLE NETWORKS

(71) Applicant: Nokia Technologies Oy, Espoo (FI)

(72) Inventors: Osman Nuri Can Yilmaz, Espoo (FI); Diomidis Michalopoulos, Munich (DE); Taylan Sahin, Munich (DE); Ping-Heng Kuo, Cambridge (GB)

(73) Assignee: Nokia Solutions and Networks Oy, Espoo (FI)

( * ) Notice: Subject to any disclaimer, the term of this patent is extended or adjusted under 35 U.S.C. 154(b) by 331 days.

(21) Appl. No.: 18/558,518

(22) PCT Filed: Jun. 11, 2021

(86) PCT No.: PCT/EP2021/065794
§ 371 (c)(1),
(2) Date: Nov. 1, 2023

(87) PCT Pub. No.: WO2022/258197
PCT Pub. Date: Dec. 15, 2022

(65) Prior Publication Data

US 2024/0276430 A1 Aug. 15, 2024

(51) Int. Cl.
*H04W 64/00* (2009.01)
*G01S 13/76* (2006.01)

(52) U.S. Cl.
CPC ........... *H04W 64/00* (2013.01); *G01S 13/765* (2013.01)

(58) Field of Classification Search
CPC ...... H04W 64/00; G01S 13/765; G01S 1/042; G01S 5/0205; G01S 5/0236
See application file for complete search history.

(56) References Cited

U.S. PATENT DOCUMENTS

| | | | |
|---|---|---|---|
| 9,713,117 | B2 | 7/2017 | Khoryaev et al. |
| 10,440,500 | B2 | 10/2019 | Tenny |

(Continued)

FOREIGN PATENT DOCUMENTS

| | | | |
|---|---|---|---|
| WO | 2020/064120 | A1 | 4/2020 |
| WO | 2022/207422 | A1 | 10/2022 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.

(Continued)

*Primary Examiner* — Dhaval V Patel
(74) *Attorney, Agent, or Firm* — Harness, Dickey & Pierce, P.L.C.

(57) ABSTRACT

Example embodiments of the present disclosure relate to devices, methods, apparatuses and computer readable storage media of sidelink positioning. The method comprises: receiving, from a network node, configuration information comprising at least one configuration of sidelink positioning reference signal and at least one identifier of at least one radio beam, wherein the sidelink positioning reference signal is transmitted between a first user equipment and a second user equipment; determining information for controlling a transmission of sidelink positioning reference signal from the first user equipment; transmitting, to the first user equipment, a message comprising the determined information; and receiving, from the first user equipment, the sidelink positioning reference signal.

24 Claims, 9 Drawing Sheets

(56) References Cited

U.S. PATENT DOCUMENTS

| | | | | |
|---|---|---|---|---|
| 10,560,851 | B2 | 2/2020 | Guo et al. | |
| 12,010,527 | B2 * | 6/2024 | Shao | H04L 5/0025 |
| 12,035,328 | B2 * | 7/2024 | Li | H04W 72/23 |
| 2019/0230618 | A1 | 7/2019 | Saur et al. | |
| 2020/0169336 | A1 | 5/2020 | Modarres Razavi et al. | |
| 2020/0267025 | A1 | 8/2020 | Yu et al. | |
| 2021/0006372 | A1 | 1/2021 | Cha et al. | |
| 2021/0219103 | A1 * | 7/2021 | Wang | G01S 5/0236 |
| 2022/0240118 | A1 * | 7/2022 | Bao | H04L 5/005 |
| 2023/0224725 | A1 * | 7/2023 | Ma | H04B 7/0695 370/329 |
| 2024/0007987 | A1 * | 1/2024 | Liu | H04L 1/08 |
| 2024/0098757 | A1 * | 3/2024 | Yu | H04L 5/0051 |
| 2024/0147411 | A1 * | 5/2024 | Keating | G01S 5/0205 |
| 2024/0306164 | A1 * | 9/2024 | Guo | H04W 64/00 |

OTHER PUBLICATIONS

"3rd Generation Partnership Project; Technical Specification Group Radio Access Network; LTE Positioning Protocol (LPP (Release 16)", 3GPP TS 37.355, V16.4.0, Mar. 2021, pp. 1-298.

"3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305, V16.4.0, Mar. 2021, pp. 1-119.

"3rd Generation Partnership Project; Technical Specification Group Radio Access Network; Study on NR Positioning Enhancements; (Release 17)", 3GPP TR 38.857, V17.0.0, Mar. 2021, 545 pages.

"On Demand Transmission of PRS for NR", 3GPP TSG-RAN WG2 Meeting #105, R2-1901373, Agenda: 11.8.2, Qualcomm Incorporated, Feb. 25-Mar. 1, 2019, pp. 1-15.

"Co-Ordination Among UE, gNB and Location Server for PRS Configuration and Feedbacks", 3GPP TSG RAN WG2#105, R2-1901533, Agenda: 11.8.3, Ericsson, Feb. 25-Mar. 1, 2019, pp. 1-3.

"On-demand and dynamic PRS configuration for DL-TDOA", 3GPP TSG-RAN WG2 Meeting #108, R2-1916106, Agenda: 6.8.2.1, Nokia, Nov. 18-22, 2019, 5 pages.

"Measurements for PRS on-demand", 3GPP TSG RAN WG1 #96bis, R1-1905265, Agenda: 7.2.10.4, Nokia, Apr. 8-12, 2019, 3 pages.

"Report on [Post112-e][608][POS] Support of on-demand PRS", 3GPP TSG-RAN WG2 #113e, R2-2101389, Agenda: 8.11.2, Ericsson, Jan. 25-Feb. 5, 2021, pp. 1-19.

"Solution directions to reduce end-to-end latency", 3GPP TSG-RAN WG2 Meeting #112 electronic, R2-2009023, Agenda: 8.11.2, Intel Corporation, Nov. 2-13, 2020, 12 pages.

"Msc-generator", Sourceforge, Retrieved on Nov. 9, 2023, Webpage available at : https://sourceforge.net/projects/msc-generator/.

Liu et al., "A Highly Accurate Positioning Solution for C-V2X Systems", Sensors, vol. 21, No. 4, 2021, pp. 1-20.

International Search Report and Written Opinion received for corresponding Patent Cooperation Treaty Application No. PCT/EP2021/065794, dated Mar. 30, 2022, 14 pages.

"On-Demand DL-PRS", 3GPP TSG-RAN WG2 Meeting #114-e, R2-2106084, Agenda: 8.11.4, Qualcomm Incorporated, May 19-27, 2021, 10 pages.

"Semi-persistent and aperiodic SRS-for-positioning", 3GPP TSG-RAN WG2 Meeting #109-e, R2-2001214, Agenda: 6.8.2.1, Qualcomm incorporated, Feb. 24-Mar. 6, 2020, 15 pages.

* cited by examiner

POSITIONING SIGNAL MANAGEMENT IN SIDELINK CAPABLE NETWORKS

RELATED APPLICATION

This application claims priority to PCT Application No. PCT/EP2021/065794, filed on Jun. 11, 2021, which is incorporated herein by reference in its entirety.

TECHNICAL FIELD

The teachings in accordance with the exemplary embodiments of this disclosure relate generally to configuration of reference signals in SL for positioning, by a network, wherein the network can determine and provide potentially multiple SL positioning reference signal (PRS) configurations to users, where each configuration is mapped to (e.g., conditions of) uplink (UL)/downlink (DL) beams, and wherein a user selects one of the provided SL PRS configurations for positioning based on the UL/DL beams it observes/measures.

BACKGROUND

This section is intended to provide a background or context to the disclosure that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:

| | |
|---|---|
| AMF | Access and Mobility management Function |
| DL | Downlink |
| gNB | NR base station |
| LCS | Location Services |
| LMC | Location Management Component |
| LMF | Location Management Function |
| LTE | Long Term Evolution |
| MO-LR | Mobile-originated Location Request |
| MT-LR | Mobile-terminated Location Request |
| NR | New (5G) Radio |
| NgNB | Neighboring gNB |
| ODPRS | On-demand PRS |
| PRS | Positioning Reference Signal |
| QoS | Quality of Service |
| RRC | Radio Resource Control |
| SL | Sidelink |
| SgNB | Serving gNB |
| SIB | System Information Block |
| SLP | SUPL Location Platform |
| SMLC | Serving Mobile Location Centre |
| SRS | Sounding Reference Signal |
| SUPL | Secure User Plane Location |
| TRP | Transmission Reception Point |
| UE | User Equipment |
| UL | Uplink |

Wireless communications systems are widely deployed to provide various types of communication services over content such as voice, video, packet data, messaging, broadcast, etc. These wireless communications are capable of supporting communication with multiple users by sharing the available system resources (e.g., time, frequency, and power).

In some wireless communications systems, such as internet of things (I-IoT) applications, various UEs may be configured to communicate with each other over sidelink channels. These sidelink communications may enhance the wireless systems via reduced latency, multi-path diversity, coverage extension, battery-life improvement, location enhancement, and infrastructure-less communication.

SUMMARY

This section contains examples of possible implementations and is not meant to be limiting.

In a first aspect, there is provided a first user equipment, comprising: at least one processor; and at least one memory including computer program code, where the at least one memory and the computer program code are configured, with the at least one processor, to cause the first user equipment to at least perform: receiving, from a network node, configuration information comprising at least one configuration of sidelink positioning reference signal and at least one identifier of at least one radio beam, wherein the sidelink positioning reference signal is transmitted between the first user equipment and a second user equipment; receiving, from the second user equipment, a message comprising information for controlling a transmission of the sidelink positioning reference signal to the second user equipment; determining a configuration of the sidelink positioning reference signal to be transmitted to the second user equipment based at least on the information; and transmitting, to the second user equipment, the sidelink positioning reference signal based at least on the determined configuration of the sidelink positioning reference signal.

In a second aspect, there is provided a method comprising: receiving, at a first user equipment from a network node, configuration information comprising at least one configuration of sidelink positioning reference signal and at least one identifier of at least one radio beam, wherein the sidelink positioning reference signal is transmitted between the first user equipment and a second user equipment; receiving, from the second user equipment, a message comprising information for controlling a transmission of the sidelink positioning reference signal to the second user equipment; determining a configuration of the sidelink positioning reference signal to be transmitted to the second user equipment based at least on the information; and transmitting, to the second user equipment, the sidelink positioning reference signal based at least on the determined configuration of the sidelink positioning reference signal.

In a third aspect, there is provided an apparatus comprising: means for receiving, from a network node, configuration information comprising at least one configuration of sidelink positioning reference signal and at least one identifier of at least one radio beam, wherein the sidelink positioning reference signal is transmitted between a first user equipment and a second user equipment; means for receiving, from the second user equipment, a message comprising information for controlling a transmission of the sidelink positioning reference signal to the second user equipment; means for determining a configuration of the sidelink positioning reference signal to be transmitted to the second user equipment based at least on the information; and means for transmitting, to the second user equipment, the sidelink positioning reference signal based at least on the determined configuration of the sidelink positioning reference signal.

In a fourth aspect, there is provided a computer readable medium having a computer program stored thereon which, when executed by at least one processor of a device, causes the device to carry out the method according to the second aspect.

In a fifth aspect, there is provided a second user equipment, comprising: at least one processor; and at least one memory including computer program code, where the at least one memory and the computer program code are configured, with the at least one processor, to cause the second user equipment to at least perform: receiving, from a network node, configuration information comprising at least one configuration of sidelink positioning reference signal and at least one identifier of at least one radio beam, wherein the sidelink positioning reference signal is transmitted between a first user equipment and the second user equipment; determining information for controlling a transmission of sidelink positioning reference signal from the first user equipment; transmitting, to the first user equipment, a message comprising the determined information; and receiving, from the first user equipment, the sidelink positioning reference signal.

In a sixth aspect, there is provided a method comprising: receiving, at a second user equipment from a network node, configuration information comprising at least one configuration of sidelink positioning reference signal and at least one identifier of at least one radio beam, wherein the sidelink positioning reference signal is transmitted between a first user equipment and the second user equipment; determining information for controlling a transmission of sidelink positioning reference signal from the first user equipment; transmitting, to the first user equipment, a message comprising the determined information; and receiving, from the first user equipment, the sidelink positioning reference signal.

In a seventh aspect, there is provided an apparatus comprising: means for receiving, from a network node, configuration information comprising at least one configuration of sidelink positioning reference signal and at least one identifier of at least one radio beam, wherein the sidelink positioning reference signal is transmitted between a first user equipment and a second user equipment; means for determining information for controlling a transmission of sidelink positioning reference signal from the first user equipment; transmitting, to the first user equipment, a message comprising the determined information; and receiving, from the first user equipment, the sidelink positioning reference signal In an eighth aspect, there is provided a computer readable medium having a computer program stored thereon which, when executed by at least one processor of a device, causes the device to carry out the method according to the sixth aspect.

In a ninth aspect, there is provided a network node, comprising: at least one processor; and at least one memory including computer program code, the at least one memory and the computer program code being configured to, with the at least one processor, cause the network node to perform: determining configuration information comprising at least one configuration of sidelink positioning reference signal and at least one identifier of at least one radio beam, wherein the at least one configuration of sidelink positioning reference signal is between a first user equipment and a second user equipment; and transmitting the configuration information to the first user equipment and the second user equipment.

In a tenth aspect, there is provided a method comprising: determining by a network node of a communication network configuration information comprising at least one configuration of sidelink positioning reference signal and at least one identifier of at least one radio beam, wherein the at least one configuration of sidelink positioning reference signal is between a first user equipment and a second user equipment; and transmitting the configuration information to the first user equipment and the second user equipment.

In an eleventh aspect, there is provided an apparatus comprising: means for determining configuration information comprising at least one configuration of sidelink positioning reference signal and at least one identifier of at least one radio beam, wherein the at least one configuration of sidelink positioning reference signal is between a first user equipment and a second user equipment; and means for transmitting the configuration information to the first user equipment and the second user equipment.

In a twelfth aspect, there is provided a computer readable medium having a computer program stored thereon which, when executed by at least one processor of a device, causes the device to carry out the method according to the tenth aspect.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

In example embodiments as disclosed herein relate to at least configuration of reference signals in SL for positioning, by the network, wherein the network can determine and provide potentially multiple SL positioning reference signal (PRS) configurations to users, where each configuration is mapped to (conditions of) UL/DL beams, and where a user selects one of the provided SL PRS configurations for positioning, based on the UL/DL beams it observes/measures.

Example embodiments relate to the sidelink (SL) positioning concept which is expected to be introduced in Rel-18. It is an enabler for many use cases e.g., road safety, efficiency, autonomous driving. While SL can operate in-coverage, partial coverage and out-of-coverage scenarios.

As examples, in an in-coverage scenario a network (e.g., eNB) may allocate a specific resource for a sidelink to a transmitting UE, or may allocate a resources that can be used by the transmitting UE. An out-of-coverage scenario is a case where a network-based control may not be possible. Still in this case a transmitting UE may still be able to perform SL communication through a predetermined resources, e.g., for normal in-coverage cellular traffic. Then, in a partial coverage scenario, an in-coverage UE and an out-of-coverage UE can co-exist. For example an out-of-coverage UE may use a predetermined resource, and an in-coverage UE may perform communication through a resource controlled by the network.

It is noted that, "in-coverage" SL scenario is one main focus of example embodiments of the present disclosure.

In example embodiments of the present disclosure, the baseline concept taken is On-Demand Positioning Reference Signal (ODPRS), which is introduced for UL/DL in Rel-16 as described below. The embodiments disclosed aim to enable the use of ODPRS for SL positioning with minimal interference impact to the system and thus avoiding positioning accuracy issues overall in in-coverage SL scenarios.

When describing example embodiments of the present disclosure below, we use a relevant terminology, such as anchor UE and target UE. Here, the anchor UE, or the supportive UE, refers to the device that provides the SL positioning signal; and the target UE refers to the device that measures the respective SL signal.

An On-Demand PRS (ODPRS) Concept

The concept of on-demand Positioning Reference Signal (PRS) states that PRS are transmitted only to the direction where there is at least one UE which will receive and process them for deriving the location of the UE (either at the UE itself or at the network side after the measurements are reported to the network). Similarly, dynamic PRS dictates that in case there is a need for stronger reception of PRS signals (for instance, for higher accuracy), then the network can provide increased PRS resources to the designated areas.

Figure 1:
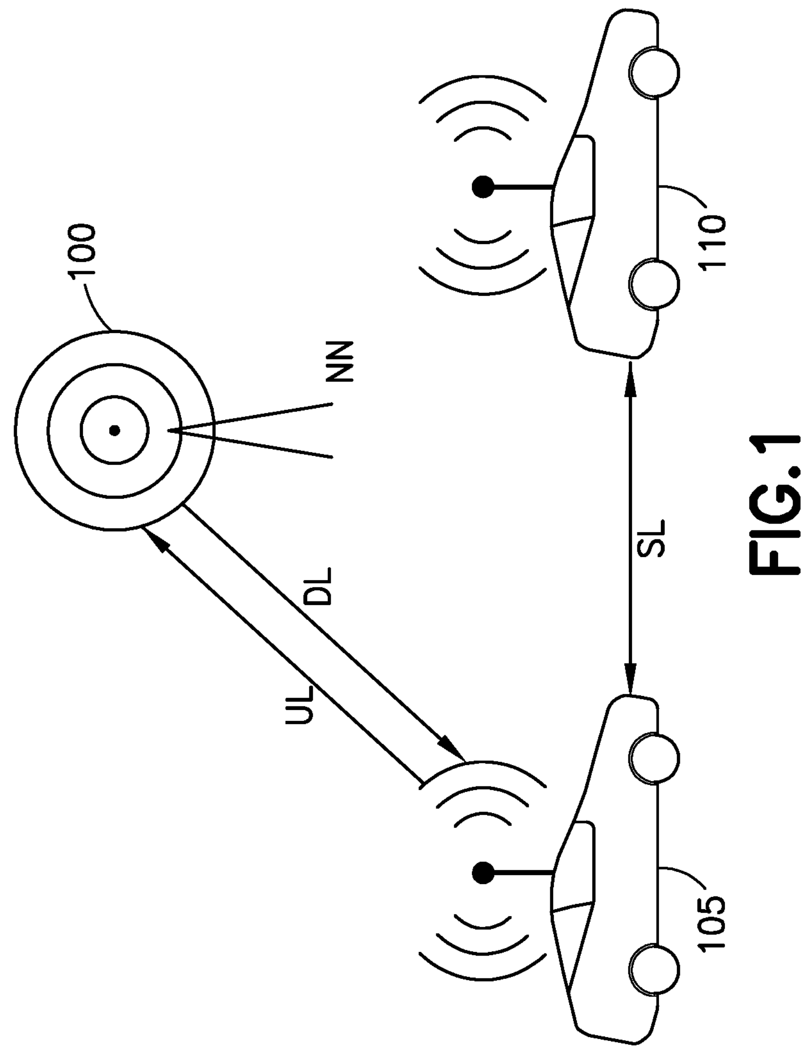
FIG. 1 shows an illustration of different communication links available in SL-capable networks.

FIG. 1 shows an illustration of different communication links available in SL-capable networks. As shown in FIG. 1, there is communication link between UE vehicle 105 (e.g., an anchor UE) and NN 100, and sidelink (SL) communication between UE vehicle 105 and UE vehicle 110 (e.g., a target UE). The PRS is transmitted on the SL, where the configuration of PRS resource is mapped to beams of other communication links between UE vehicle 110 and other devices (e.g., NN 100, a gNB or a eNB), to avoid interference in the SL communication between UE vehicle 105 and UE vehicle 110 and other communication links between other devices our UEs and UE vehicle 105 or/and UE vehicle 110, and other communication links between other devices and other UEs.

Figure 2:
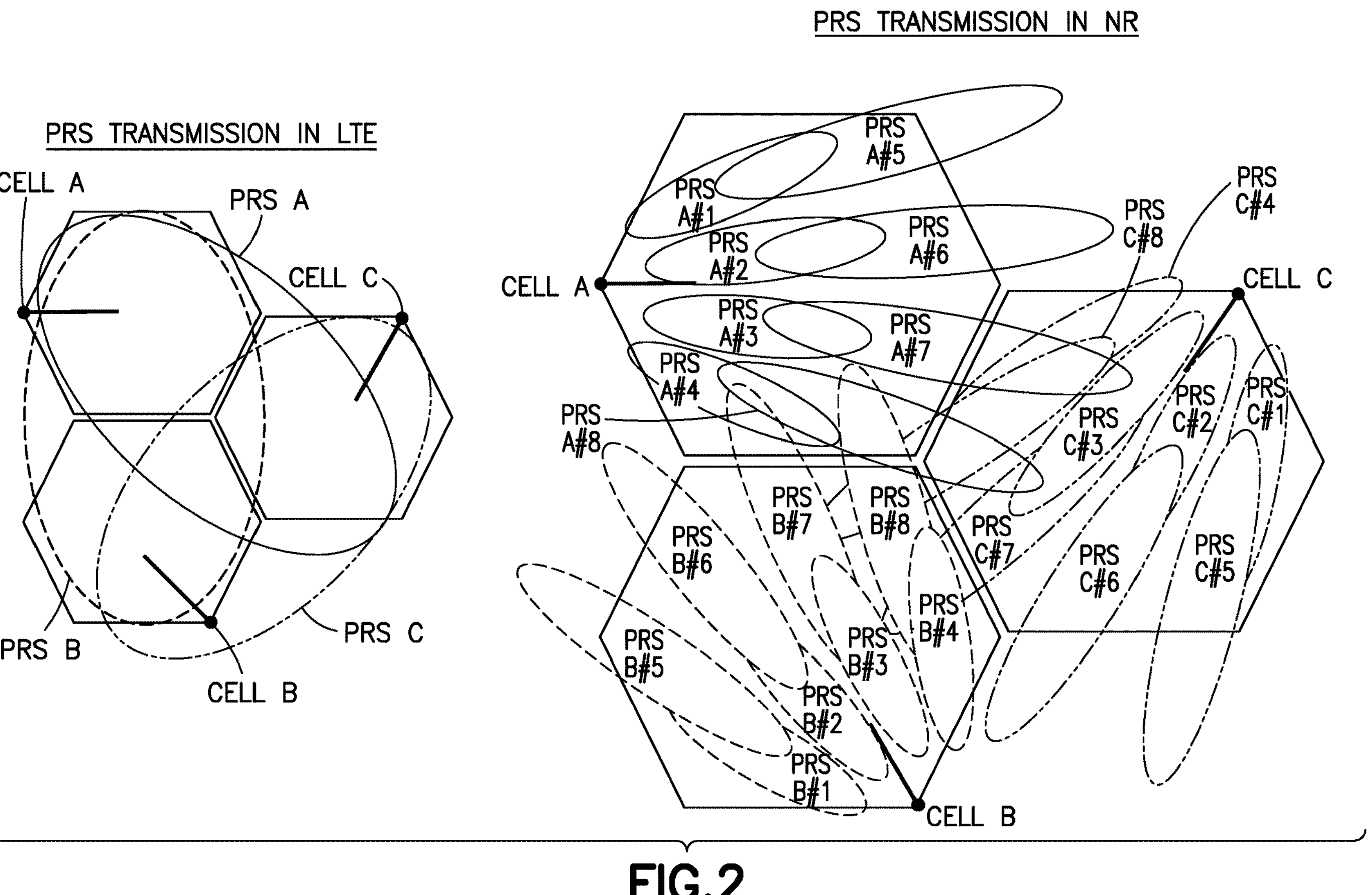
FIG. 2 shows PRS transmission in LTE and NR from beams in NR.

The concept of dynamic/on-demand PRS is particularly relevant for NR, due to the associated beamforming: With reference to FIG. 2, given that PRS resources are transmitted from different beams in order to achieve good coverage, transmitting PRS from all beams of a cell would result in a waste of resources, therefore on-demand (dynamic) PRS appears as a resource-efficient approach.

FIG. 2 shows PRS transmission in LTE and NR from beams in NR. As shown in FIG. 2 with the PRS resource transmission in LTE a PRS A, PRS B, and PRS C are associated with each cell A, cell B, and cell C as shown in FIG. 2. Whereas, as shown in PRS transmission in NR of FIG. 2 the PRS resources are for individual or particular beams for each of cell A, cell B, and cell C.

An anchor UE needs to transmit a positioning signal e.g., Positioning Reference Signal (PRS) or Sounding Reference Signal (SRS) to enable positioning the target UE. A positioning signal may be phase-rotated in proportion to the frequency magnitude of reference symbols mapping and a distance from the UE to an eNB for example. Depending on the interference conditions and QoS requirements, positioning signal might not satisfy the requirements (e.g., accuracy). This is because, positioning signal of different UEs and gNBs might interfere in case of in-coverage SL positioning scenarios when the SL and UL/DL share a common pool of radio spectrum resources. For instance, the interference problem may arise when the target UE listens to a SL positioning signal while a nearby UE is transmitting (in UL or SL) a signal that interferes the target UE.

Example embodiments of the present disclosure targets addressing the absence of solutions to mitigate the aforementioned interference problem. This is especially critical when a certain quality of service needs to be met for positioning. The proposed solution allows the location management function (LMF) to coordinate the SL PRS transmissions among the UEs involved in order to alleviate the interference problem.

Figure 3:
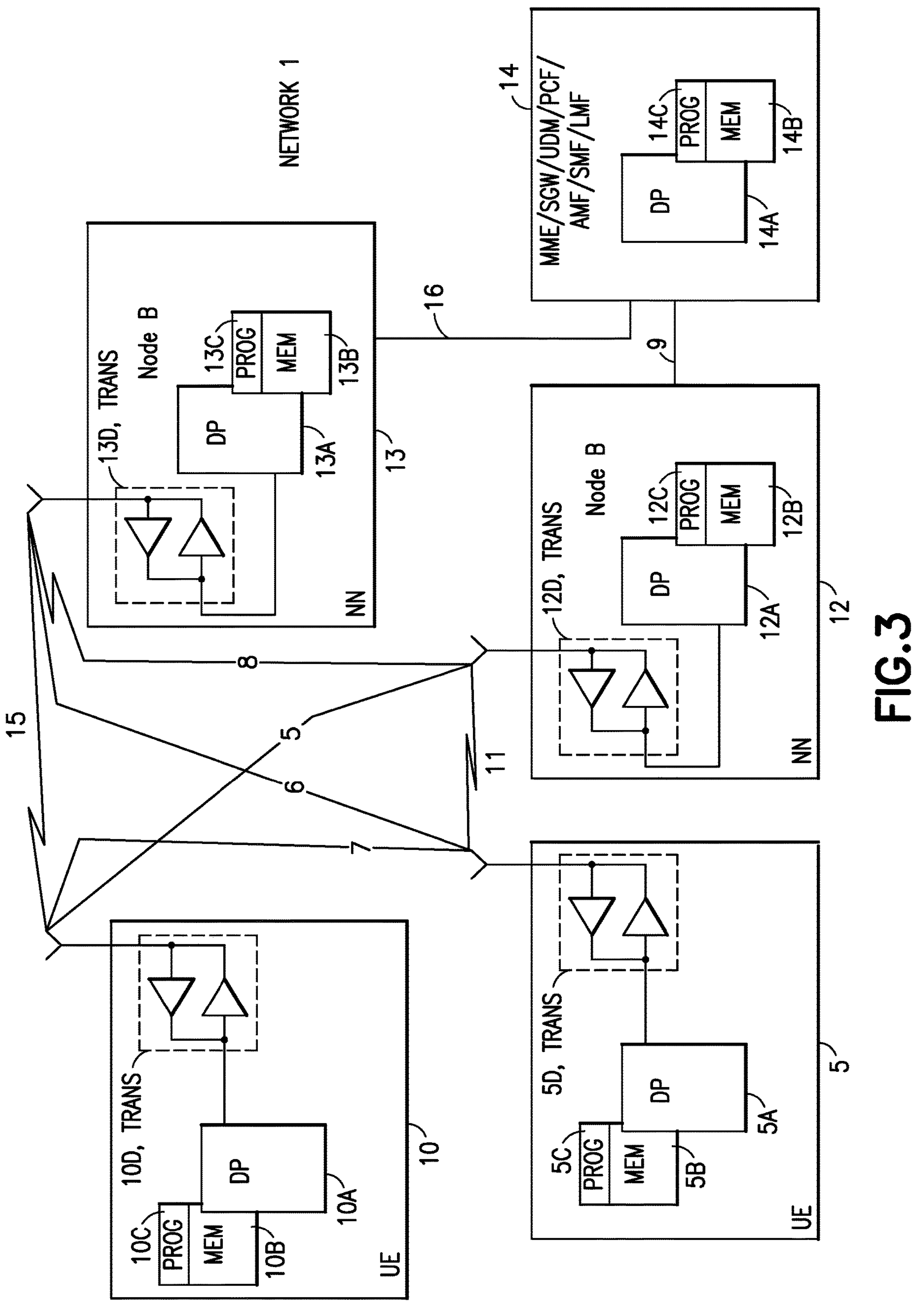
FIG. 3 shows a high level block diagram of various devices used in carrying out various aspects of the present disclosure.

Before describing the example embodiments of the present disclosure in detail, reference is made to FIG. 3 for illustrating a simplified block diagram of various electronic devices of one possible and non-limiting exemplary system that are suitable for use in practicing the example embodiments of the present disclosure.

FIG. 3 shows a block diagram of one possible and non-limiting exemplary system in which the example embodiments of the present disclosure may be practiced. In FIG. 3, a user equipment (UE) 10 and a user equipment (UE) 5 is in wireless communication with a wireless network 1 or network 1 as in FIG. 3. The wireless network 1 or network 1 as in FIG. 3 can comprise a communication network such as a mobile network e.g., the mobile network 1 or first mobile network as disclosed herein. Any reference herein to a wireless network 1 as in FIG. 3 can be seen as a reference to any wireless network as disclosed herein. Further, the wireless network 1 as in FIG. 3 can also comprises hardwired features as may be required by a communication network. A UE is a wireless, typically mobile device that can access a wireless network. The UE, for example, may be a mobile phone (or called a "cellular" phone) and/or a computer with a mobile terminal function. For example, the UE or mobile terminal may also be a portable, pocket, handheld, computer-embedded or vehicle-mounted mobile device and performs a language signaling and/or data exchange with the RAN.

The UE 5 (user equipment 5) includes one or more processors DP 5A, one or more memories MEM 5B, and one or more transceivers TRANS 5D interconnected through one or more buses. Each of the one or more transceivers TRANS 5D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 5D which can be optionally connected to one or more antennas for communication to NN 12 and NN 13, respectively. The one or more memories MEM 5B include computer program code PROG 5C. The UE 5 communicates with NN 12 and/or NN 13 via a wireless link 11 and link 6, respectively. The one or more memories MEM 5B and the computer program code PROG 5C are configured to cause, with the one or more processors DP 5A, the UE 5 to perform one or more of the operations as described herein.

The UE 10 (user equipment 10) includes one or more processors DP 10A, one or more memories MEM 10B, and one or more transceivers TRANS 10D interconnected through one or more buses. Each of the one or more transceivers TRANS 10D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 10D which can be optionally connected to one or more antennas for communication to NN 12 and NN 13, respectively. The one or more memories MEM 10B include computer program code PROG 10C. The UE 10 communicates with NN 12 and/or NN 13 via a wireless link 5 and wireless link 15, respectively. The one or more memories MEM 10B and the computer program code PROG 10C are configured to cause, with the one or more processors DP 10A, the UE 10 to perform one or more of the operations as described herein.

The NN 12 (NR/5G Node B, an evolved NB, NR/5G device or LTE device) is a network node such as a master or secondary node base station (e.g., for NR or LTE) that communicates with devices such as NN 13, UE 5, and/or UE 10 of FIG. 3. The NN 12 provides access to wireless devices such as the UE 5 and/or the UE 10 to the wireless network 1. The NN 12 includes one or more processors DP 12A, one or more memories MEM 12C, and one or more transceivers TRANS 12D interconnected through one or more buses. In accordance with the example embodiments the one or more transceivers TRANS 12D can include X2 and/or Xn and/or other interfaces for use to perform the example embodiments of the present disclosure. Each of the one or more transceivers TRANS 12D includes a receiver and a transmitter. The one or more transceivers TRANS 12D can be optionally connected to one or more antennas for communication over at least link 11 and/or link 5 and/or link 8. The TRANS 12D can connect with the UE 5 and/or UE 10 via links 11 or link 5, respectively. The one or more memories MEM 12B and the computer program code PROG 12C are configured to cause, with the one or more processors DP 12A, the NN 12 to perform one or more of the operations as described herein. The NN 12 may communicate with another gNB or eNB, or a device such as the NN 13 such as via link 8. Further any of the links as disclosed herein may be wired or wireless or both. Further any of the links as disclosed herein may be configured to be through other network devices such as, but not limited to an SGW/AMF/UPF device such as the MME/SGW/UDM/PCF/AMF/SMF/LMF 14 of FIG. 3. The NN 12 may perform functionalities of a Mobility Management Entity (MME), Serving Gateway (SGW), Unified Data Management (UDM), Policy Control Function (PCF), User Plane Function (UPF), Access and Mobility Management Function (AMF) and/or a Location Management function (LMF) for LTE and similar functionality for 5G.

The NN 13 (NR/5G Node B, an evolved NB, NR/5G device or LTE device) is also a network node such as a master or secondary node base station (e.g., for NR or LTE) that communicates with devices such as NN 12, UE 5, and/or UE 10 of FIG. 3. The NN 13 can be associated with a mobility function device such as an AMF or SMF, further the NN 13 may comprise a NR/5G Node B or possibly an evolved NB, a base station such as a master or secondary node base station (e.g., for NR or LTE) that communicates with devices such as the NN 12 and/or UE 5 and/or UE 10 in the wireless network 1. The NN 13 includes one or more processors DP 13A, one or more memories MEM 13B, one or more network interfaces, and one or more transceivers TRANS 12D interconnected through one or more buses. In accordance with the example embodiments these network interfaces of NN 13 can include X2 and/or Xn interfaces and/or other interfaces for use to perform the example embodiments of the present disclosure. Each of the one or more transceivers TRANS 13D includes a receiver and a transmitter that can optionally be connected to one or more antennas. The one or more memories MEM 13B include computer program code PROG 13C. For instance, the one or more memories MEM 13B and the computer program code PROG 13C are configured to cause, with the one or more processors DP 13A, the NN 13 to perform one or more of the operations as described herein. The NN 13 may communicate with the UE 10 and/or the UE 5 or any other device using, e.g., at least link 15 and/or link 6. The link 8 as shown in FIG. 3 can be used for communication between the NN 12 and the NN 13. It is noted that any of the link as disclosed herein can comprise one or more links.

It is noted that that the NN 12 and/or the NN 13 can be configured (e.g. based on standards implementations etc.) to perform functionality of a Location Management Function (LMF). The LMF functionality may be embodied in either of the NN 12 or NN 13 or may be part of these network devices or other devices associated with these devices. In addition, an LMF such as the LMF of the MME/SGW/UDM/PCF/AMF/SMF/LMF 14 of FIG. 3, as at least described below, can be co-located with the NN 12 and/or NN 13 such as to be separate from the NN 12 and/or NN 13 of FIG. 3 for performing operations in accordance with example embodiments of the invention as disclosed herein.

Figure 6:
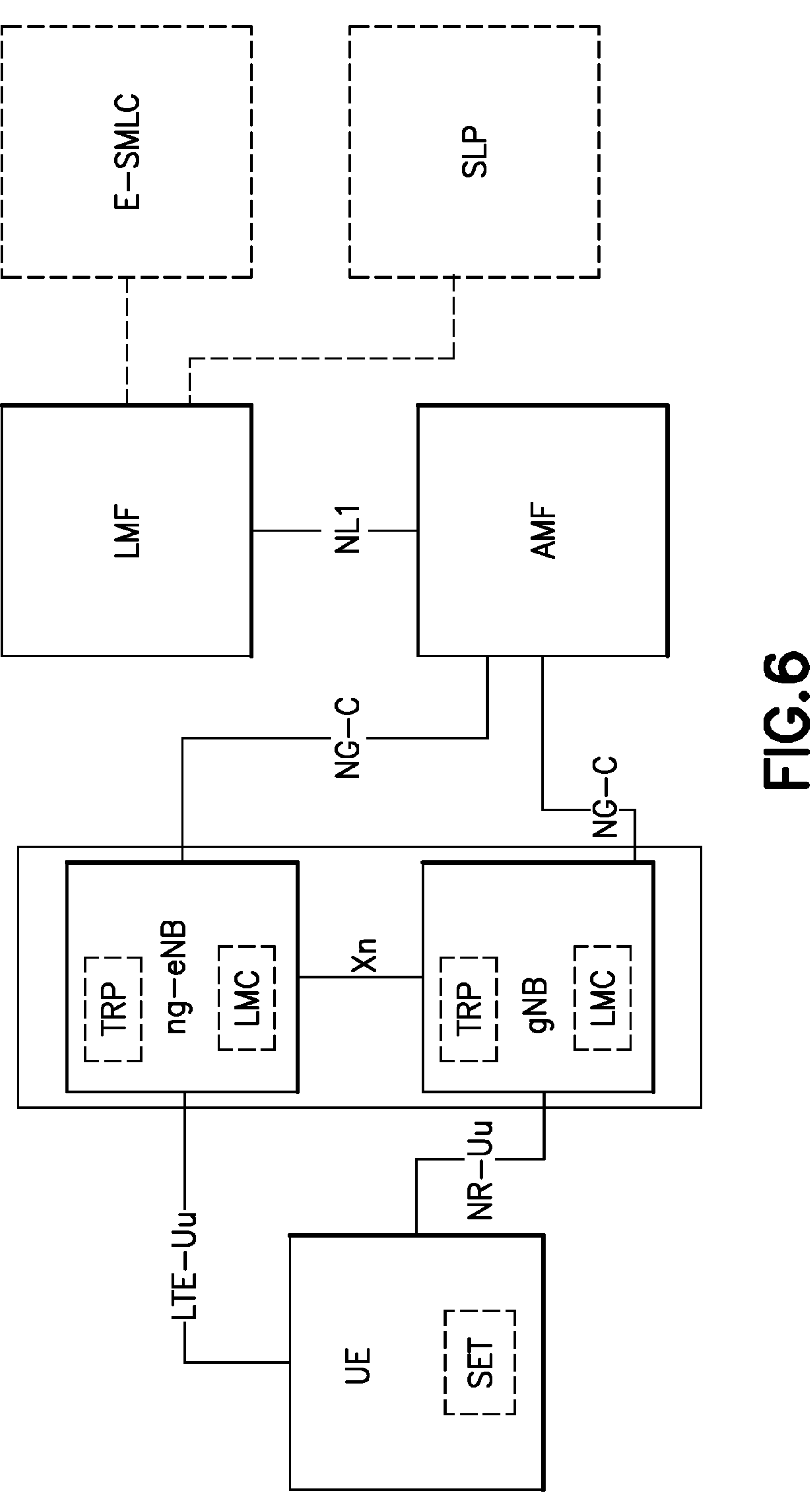
FIG. 6 shows an overall user equipment positioning architecture in accordance with example embodiments of the present disclosure.

These links, for instances, links 5, 6, 7, 8, 11, 15, 16, and 9 maybe wired or wireless or both and the links and/or other interfaces such as being shown in FIG. 3 or FIG. 6 may implement Xn/X2 e.g., link 8 between the NN 12 and the NN 13 can include an X2/Xn interface type link. Further, as stated above any of these links may be through other network devices such as, but not limited to an MME/SGW device such as the MME/SGW/UDM/PCF/AMF/SMF/LMF 14 of FIG. 3. The MME/SGW/UDM/PCF/AMF/SMF/LMF 14 of FIG. 3 may be used to control any functions of any of the devices of the Network 1 as shown in FIG. 3.

The one or more buses of the device of FIG. 3 may be address, data, or control buses, and may include any interconnection mechanism, such as a series of lines on a motherboard or integrated circuit, fiber optics or other optical communication equipment, wireless channels, and the like. For example, the one or more transceivers TRANS 12D, TRANS 13D, TRANS 5D, and/or TRANS 10D may be implemented as a remote radio head (RRH), with the other elements of the NN 12 being physically in a different location from the RRH, and one or more buses could be implemented in part as fiber optic cable to connect the other elements of the NN 12 to a RRH for example.

It is noted that although FIG. 3 shows a network nodes Such as NN 12 and NN 13. Any of these nodes may can incorporate or be incorporated into an eNodeB or eNB or gNB such as for LTE and NR, and would still be configurable to perform example embodiments of the present disclosure.

Also it is noted that description herein indicates that “cells” perform functions, but it should be clear that the gNB that forms the cell and/or a user equipment and/or mobility management function device that will perform the functions. In addition, the cell makes up part of a gNB, and there can be multiple cells per gNB.

The wireless network 1 or any network it can represent may or may not include a MME/SGW/UDM/PCF/AMF/SMF/LMF 14 that may include Mobility Management Entity (MME), and/or Serving Gateway (SGW), and/or Unified Data Management (UDM), and/or Policy Control Function (PCF), and/or Access and Mobility Management Function (AMF), and/or Session Management Function (SMF), and/or Authentication Server Function (AUSF) and/or Location Management Function (LMF) and which provides connectivity with a further network, such as a telephone network and/or a data communications network (e.g., the Internet), and which is configured to perform any 5G and/or NR operations in addition to or instead of other standards operations at the time of this application. The MME/SGW/UDM/PCF/AMF/SMF/LMF 14 is configurable to perform operations in accordance with example embodiments of the present disclosure in any of an LTE, NR, 5G and/or any standards based communication technologies being performed or discussed at the time of this application. In addition, it is noted that the operations in accordance with example embodiments of the present disclosure, as performed by the NN 12 and/or the NN 13, may also be performed at MME/SGW/UDM/PCF/AMF/SMF/LMF 14.

Regarding the LMF functionality of the MME/SGW/UDM/PCF/AMF/SMF/LMF 14 of FIG. 3, the LMF receives measurements and assistance information from the communication network and user equipment (UE). This can be via an Access and Mobility Management Function (AMF) over an interface to determine a position of the UE. The UE 5 and/or the UE 10 as in FIG. 3 may communicate with the LMF via at least any of links 5, 6, 11, and/or 15. The NN 12 and/or NN 13 can if necessary then further communicate with the LMF of the MME/SGW/UDM/PCF/AMF/SMF/LMF 14 of FIG. 3 via the link 16 or link 9 as in FIG. 3.

It is noted that the link 16 or link 9 can include any links needed between UE 5, UE 10, NN 12, and/or NN 13 and the MME/SGW/UDM/PCF/AMF/SMF/LMF 14 of FIG. 3 for any of these devices to communicate with at least the LMF of the MME/SGW/UDM/PCF/AMF/SMF/LMF 14 of FIG. 3. Further, it is noted that any of links that are mentioned in this paper can include hardwired links and/or wireless links and, as needed, and/or include any type of interface (e.g., LTE and/or 5G interface) such as but not limited to at least one of an Xn, X2, S1, NG, NG-C, NL1, E1, and/or F1 type interface.

The MME/SGW/UDM/PCF/AMF/SMF/LMF 14 includes one or more processors DP 14A, one or more memories MEM 14B, and one or more network interfaces (N/W I/F(s)), interconnected through one or more buses coupled with at least links 16 and 9. Communication between the NN 12 or NN 13 and the LMF may be performed via an Access and Mobility Management function (AMF) e.g., of the MME/SGW/UDM/PCF/AMF/SMF/LMF 14. A control plane interface between NN 12 and/or NN 13 (or a gNB) and AMF can be an NG-C interface and an interface between the AMF and LMF can be NL1. In accordance with the example embodiments these network interfaces can include X2 and/or Xn and/or other interfaces for use to perform the example embodiments of the present disclosure. The one or more memories MEM 14B include computer program code PROG 14C. The one or more memories MEM 14B and the computer program code PROG 14C are configured to, with the one or more processors DP 14A, cause the MME/SGW/UDM/PCF/AMF/SMF/LMF 14 to perform or work with the NN 12 or NN 13 to perform one or more operations which may be needed to support the operations in accordance with the example embodiments of the present disclosure.

The wireless Network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors DP10, DP12A, DP13A, DP5A, and/or DP14A and memories MEM 10B, MEM 12B, MEM 13B, MEM 5B, and/or MEM 14B, and also such virtualized entities create technical effects.

The computer readable memories MEM 12B, MEM 13B, MEM 5B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 12B, MEM 13B, MEM 5B, and MEM 14B may be means for performing storage functions. The processors DP10, DP12A, DP13A, DP5A, and DP14A may be of any type suitable to the local technical environment, and may include one or more of general purpose computers, special purpose computers, microprocessors, digital signal processors (DSPs) and processors based on a multi-core processor architecture, as non-limiting examples. The processors DP10, DP12A, DP13A, DP5A, and DP14A may be means for performing functions, such as controlling the UE 10, UE 5, NN 12, NN 13, and other functions as described herein.

In general, various embodiments of the UE 5 and/or UE 10 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Further, the various embodiments of UE 5 or UE 10 can be used with a UE vehicle, a High Altitude Platform Station, or any other such type node associated with a terrestrial network or any drone type radio or a radio in aircraft or other airborne vehicle. The UE 5 or UE 10 can be an anchor UE or a target UE in accordance with example embodiments of the invention.

In example embodiments of this present disclosure, Location Management Function (LMF) centrally coordinates and configures the positioning signals e.g., PRS or SRS as follows:

LMF configures the anchor UE* with at least one of a SL PRS that can be requested to be activated or deactivated (or changed) by the target UE*

* Here, the anchor UE (or supportive UE) refers to the device that provides the SL positioning signal; and the target UE refers to the device that measures the respective SL signal as described in the background section.

LMF provides the target UE with a pre-configuration which contains SL PRS configurations with each mapped to the certain beam ID(s) typically referring to the beam(s) in DL (from gNB to UE).

The anchor UE may further down-select a subset of SL PRS configurations out of what have been pre-configured by the LMF.

The target UE selects at least one of a SL PRS configuration (out of pre-configured options) based on the measurements it conducts (typically in DL) e.g., using at least one of a power domain measurement (e.g., RSRP) and a time domain measurement (e.g., ToA).

The target UE sends the anchor UE an activation request for the selected configuration (and de-activation request for the not-needed configurations).

Upon the received request, anchor UE activates/de-activates/re-configures a SL PRS. In case of activation, anchor UE transmits SL PRS using the requested configuration.

Further, the concept can be specifically applied to those UEs in or transitioning to the inactive or idle mode since the network control is rather limited or absent in case the UE is in the inactive or idle state.

In example embodiments of this present disclosure, Location Management Function (LMF) centrally coordinates and configures the positioning signals at least for the sidelink positioning. In some embodiments, this functionality can be placed in the core network, in others it can be placed within RAN. In some embodiments, Positioning Signal can be referred as Positioning Reference Signal (PRS) and in others it can be Sounding Reference Signal (SRS) or similar. Depending on the communication link referred to e.g., downlink (DL), uplink (UL) or sidelink (SL), the design of the positioning signal can vary in terms of carrier frequency, bandwidth, time slot, repetition, periodicity and other properties (e.g., time and/or frequency offset and coding).

According to the embodiment above, LMF configures the anchor UE with at least one of a SL positioning signal e.g., either SL PRS or SRS that can be later requested to be activated or de-activated or changed by the target UE. Here, the anchor UE refers to the device that provides the SL positioning signal; and the target UE refers to the device that measures the respective SL signal.

In another embodiment, LMF provides the target UE with a pre-configuration information which contains SL positioning signal configuration with each mapped to at least one of a beam ID. Here the beam ID refers to a beam or set of beams available between the target UE and the gNB. Here, SL PRS configuration may consist of one or more PRS/SRS configurations that can be used over SL. The purpose of mapping SL positioning signal configuration to a set of beam ID(s) is to proactively mitigate the potential interference issues that may arise considering that PRSs are transmitted by both from/toward the network (DL/UL) and from the anchor UE(s) (SL).

In an embodiment, after the candidate SL PRS configurations are configured at the anchor UE by the LMF, the anchor UE may further down-select a subset of SL PRS configurations out of what have been pre-configured by the LMF. The subset may be determined by the anchor UE based on the feasibility of applying each of the PRS configuration. For instance, when the anchor UE tends to process heavy UL traffics, it may determine that SL PRS configuration with shorter periodicity is too resource consuming and hence inapplicable. Once the subset is determined by the anchor UE, it could be further provide the information relating to the determined subset to LMF and/or the target UE, therefore the target UE would only request the anchor UE to apply one of the SL PRS configurations within this determined subset.

In a further embodiment, the target UE selects at least one of a positioning signal configuration (out of pre-configured options) based on the measurements it conducts (typically in DL). Next, the target UE sends the anchor UE an activation request for the selected configuration (and de-activation request for the not-needed configurations).

In some embodiments, the aforementioned measurements are conducted for identifying/classifying the beams as line-of-sight (LoS) and/or strongest beam(s). In one of the embodiments, at least one of a power domain measurement (e.g., RSRP) and a time domain measurement (e.g., ToA) is considered. In fact, the strongest beam in terms of signal power alone may not be a line-of-sight (LoS) beam and thus not reliable if the LoS beam is decided to be used when selecting the suitable configuration. The beam IDs of the beams identified as LoS and/or strongest beams are used when selecting one of the configuration options given in the pre-configuration message.

In an alternative embodiment, instead of conducting dedicated measurements, the strongest beam is identified as the beam that the target UE is connected if the UE is in connected mode, otherwise it could refer to the beam that the UE camps on. However, this embodiment may not be sufficient if the LoS aspect needs to be considered as mentioned above.

In one of the embodiments, the request message may include an index number to indicate what configuration is selected. This index number may have been explicitly given in the pre-configuration message already; or it can simply be based on the order of the configuration options given in the pre-configuration message. In another embodiment, the request message can include the content of selected configuration option. In a further embodiment, it may include the measurements that the selected configuration is based on.

Upon the received request, the anchor UE activates/de-activates/re-configures a SL positioning signal. In case of the activation, anchor UE transmits a SL PRS/SRS using the requested configuration.

In further embodiments, re-configuration may be requested by the target UE if a change in the strongest/LoS beam occurs, or if there is no suitable positioning signal available in the pre-configuration information or there is a conflicting resource configuration on the target UE side. Further, re-configuration can also be decided by the anchor UE if the requested signal is being used or conflicting with the other resource configuration associated with the anchor UE.

In other embodiments, not only the strongest and/or LoS beam(s) of the target UE but also the anchor UE's can be taken into account i.e., first when mapping the positioning signal configuration to a beam ID in pre-configuration; and later when selecting a SL positioning signal to be activated or de-activated or re-configured. In this case, the strongest/LoS beam information e.g., beam IDs has to be exchanged between the UEs.

In one of the embodiments "beam" referred above could simply a DL beam. In other embodiments, instead of a DL beam, if beamforming is applied in UL, the information on both the DL and UL beams or solely the UL beam (instead of a DL beam) can be used for mapping in the pre-configuration and later for the selection and activation of a SL positioning signal.

In a further embodiment, the pre-configuration can be specifically applied to those UEs in or transitioning to the inactive or idle mode. This is because the network control is rather limited or absent in case the UE is in the inactive or idle state. In this regard, example embodiments of the present disclosure can provide means to enable proactive coordination even when there is no active cellular connectivity between a UE and the network.

In another embodiment, the pre-configuration, i.e., to which DL/UL beam ID which SL positioning signal is mapped, is determined by the network based on the UE measurements reported to the network. In another embodiment, instead of or in addition to the UE measurements, the network measurements can be used to determine the mapping of SL positioning signal to specific DL/UL beam ID(s). Here, the measurements collected or performed may relate to not only the UEs performing SL positioning but also the other UEs. I.e., the pre-configuration may be determined based on crowd-sourced measurement results.

Figure 4:
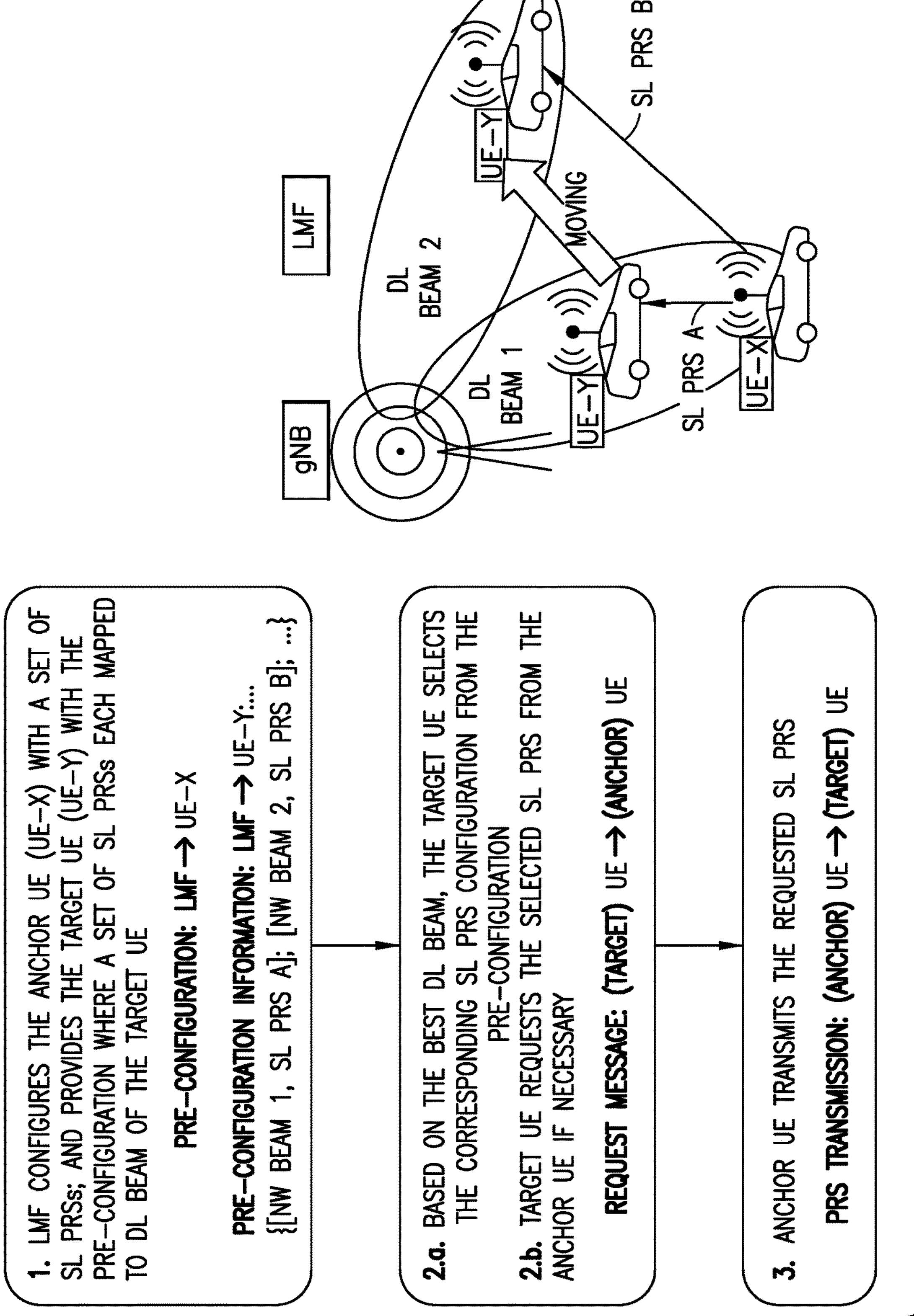
FIG. 4 shows a signaling chart depicting an example implementation of example embodiments of the present disclosure.

Functionalities in Accordance with Example Embodiments of the Present Disclosure:

FIG. 4 shows a signaling chart depicting an example implementation of example embodiments of the present disclosure. FIG. 4 illustrates an example for the above embodiments assuming that the target UE (UE-Y) is moving from DL beam 1 to DL beam 2 (also referred as NW beams in FIG. 4) while the anchor UE (UE-X) is stationary. Here, the selection and activation of a new SL positioning signal may trigger the de-activation of the former.

As shown in step 1 of FIG. 4 the LMF configures the anchor UE (UE-X) with a set of SL PRSs, and provided the target UE (UE-Y) with the pre-configuration where a set of SL PRSs each mapped to DL beam of the target UE, where Pre-configuration: LMF»UE-X, and pre-configuration information: includes LMF»UE-Y: . . . ([NW beam 1, SL PRS A]; [NW beam 2, SL PRS B]; . . . ). As shown in step 2.*a*. of FIG. 4 there is based on the best DL beam, the target UE selects the corresponding SL PRS configuration from the pre-configuration. As shown in step 2.*b*. of FIG. 4 the target UE requests the selected SL PRS from the anchor UE if necessary, such as using a request message: (target) UE»(anchor) UE. Then as shown in step 3 of FIG. 4 the anchor UE transmits the requested SL PRS, PRS transmission)Anchor) UE»(Target) UE.

It should be noted that in some scenarios, SL PRS/SRS config could be the same or different under different beams depending on the use of other PRSs/SRSs in SL, UL and DL.

Figure 5:
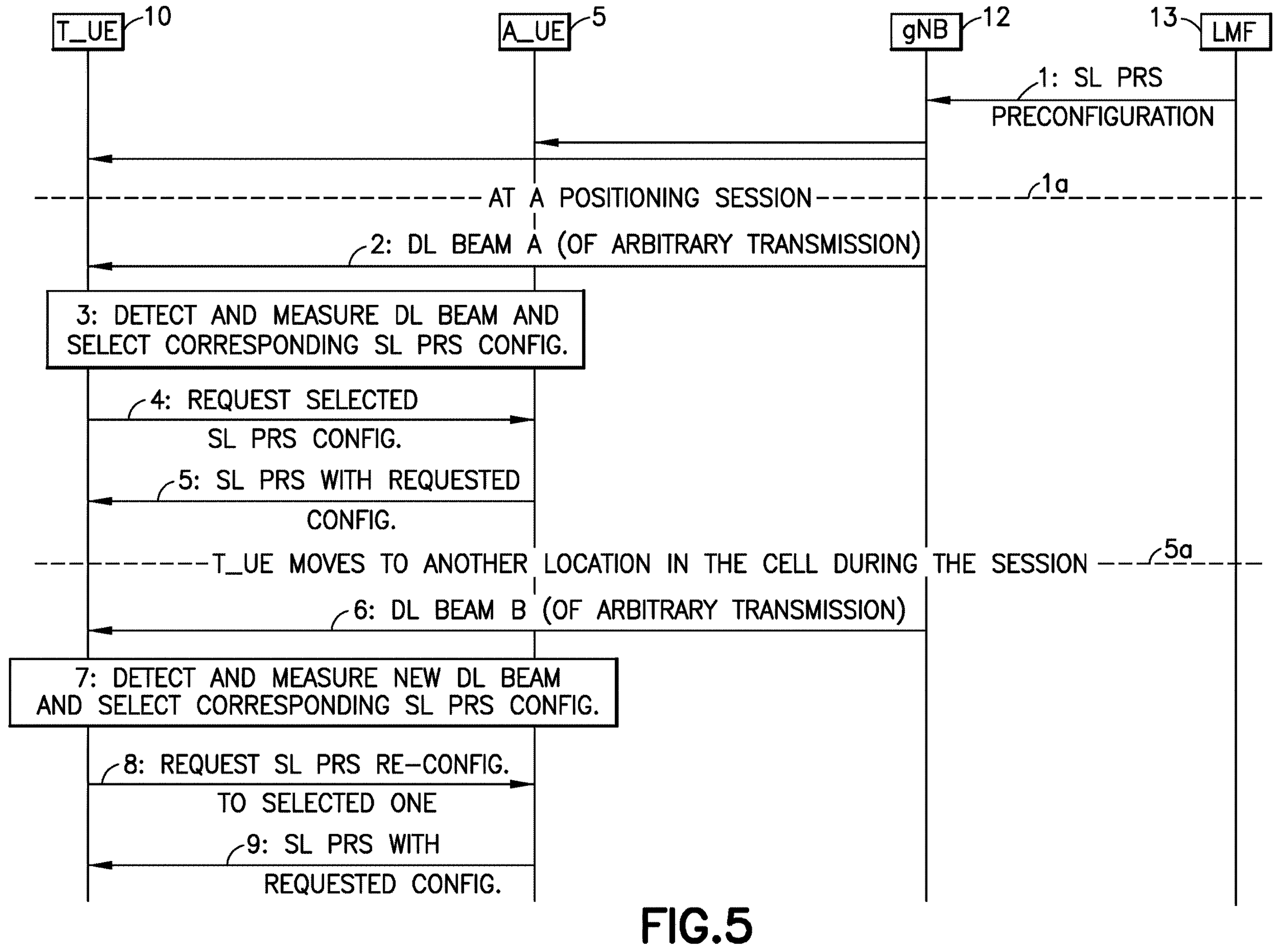
FIG. 5 shows a signaling diagram in accordance with an example embodiment of the present disclosure.

FIG. 5 shows a signaling diagram in accordance with an example embodiment of the present disclosure. FIG. 5 illustrates the signaling flowchart of an example embodiment of the present disclosure with reference to FIG. 3. The LMF 13 is configured such as the LMF of the MME/SGW/UDM/PCF/AMF/SMF/LMF 14 of FIG. 3. In some example embodiments, the LMF 13 is configured such as NN 12 and/or NN 13 of FIG. 3. As shown in step 1 of FIG. 5, LMF 13 pre-configures SL PRS configurations at the target UE (T_UE 10) and anchor UE (A_UE 5) configured such as the UE 5 and/or UE 10 as in FIG. 3, where LMF 13 may be incorporated into gNB 12 or may be of a separate server for example. In FIG. 5 each SL PRS configuration is mapped to a specific (set of) DL beam(s). At a positioning session 1*a*, T_UE first measures the DL beam(s) it can detect, and selects the corresponding SL PRS configuration according to the mapping in the pre-configuration. T_UE 10 requests the activation of the selected SL PRS configuration from the anchor UE 5, e.g., by indicating its ID in the provided pre-configuration. Upon this request, anchor UE transmits SL PRS using the requested configuration.

As shown in step 2 of FIG. 5 the gNB 12 communicates a DL beam A (of arbitrary transmission) with the T_UE 10. In step 3 of FIG. 5 the T_UE 10 detects and measures DL beam and selects corresponding SL PRS configurations. In step 4 of FIG. 5 the T_UE 10 requests from the A_UE 5 SL PRS configurations. As shown in step 5 of FIG. 5 the A_UE 5 communicates with the T_UE 10 an SL PRS and requests configuration.

Later, as shown in 5*a* of FIG. 5 the T_UE 10 moves to another location in the cell, where it observes a different (set of) DL beam(s). As shown in step 6 of FIG. 5 there is communicated between the gNB 12 and the T_UE 10 DL beam B (of arbitrary transmission). In step 7 of FIG. 5 there is performing by the T_UE 10 and/or the A_UE 5 detecting and measuring new DL beams and selecting corresponding SL PRS configurations. As shown in step 8 of FIG. 5 the T_UE 10 requests SL PRS re-configuration to select one beam. Then as shown in step 9 of FIG. 5 there is communicated between the A UE 5 and the T_UE 10 SL PRS and requested configurations.

It is noted that with respect to these operations of FIG. 5 there is based on measurements of the new DL beam(s), selecting a new SL PRS configuration corresponding to that beam(s) in the provided pre-configuration. T_UE requests the selected SL PRS configuration from the A_UE 5, upon which the A_UE 5 transmits a new SL PRS using the requested configuration.

FIG. 6 shows an overall user equipment positioning architecture in accordance with example embodiments of the present disclosure. FIG. 6 shows communication interfaces and links between gNB (e.g., NN 12 and/or NN 13 as in FIG. 3) and LMF are going via the Access and Mobility Management function (AMF). The control plane interface between gNB and AMF is the NG-C; the interface between AMF and LMF is NL1. It is noted that in the FIG. 6 LMC denotes Location Management Component, which is a candidate terminology for LMF functionalities supported by gNB.

Figure 7A:
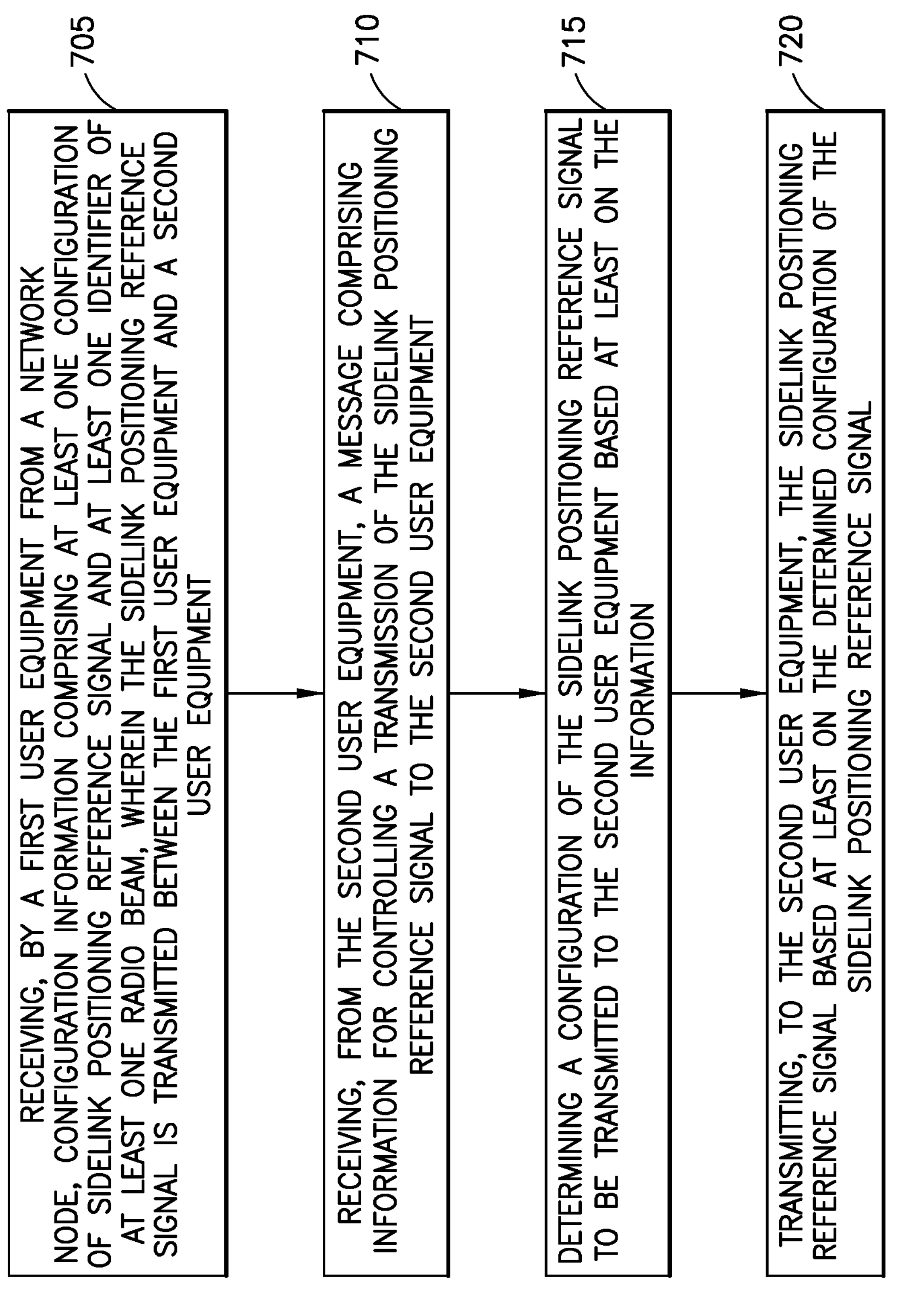
FIG. 7A, FIG. 7B, and FIG. 7C each show a method in accordance with example embodiments of the present disclosure which may be performed by an apparatus.
Figure 7B:
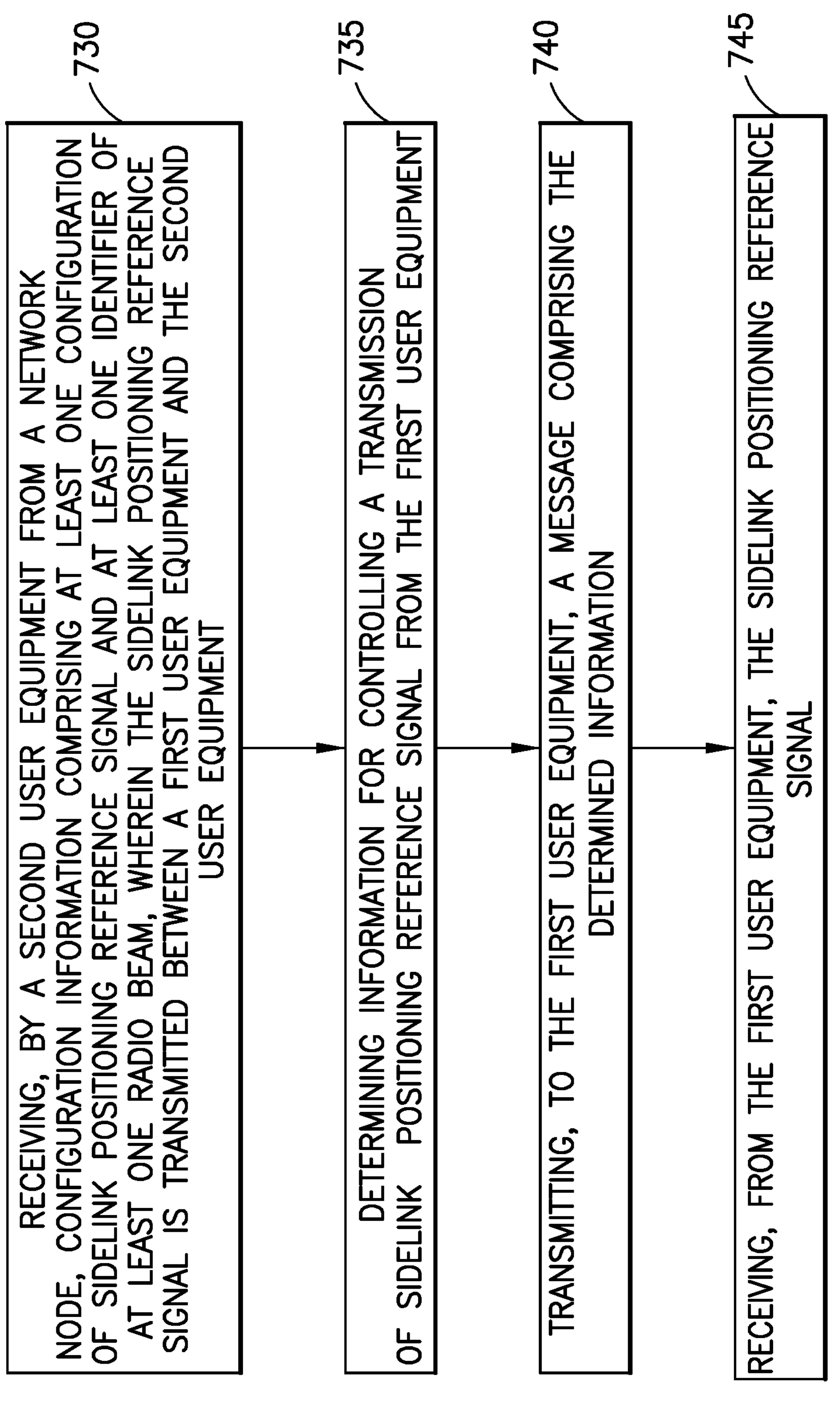
Figure 7C:
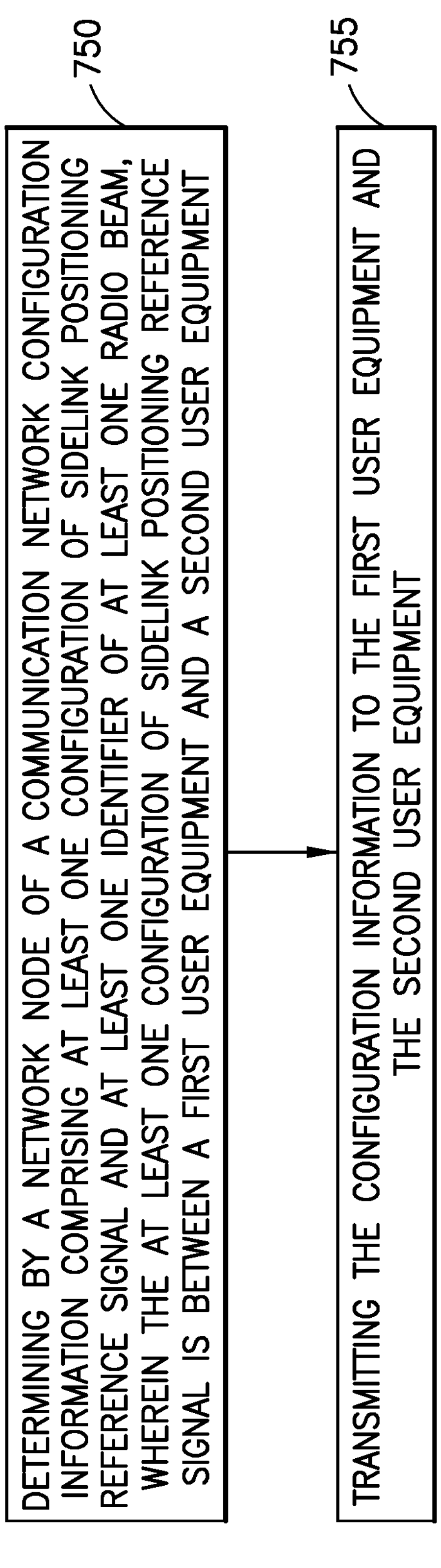

FIG. 7A, FIG. 7B, and FIG. 7C each show a method in accordance with example embodiments of the present disclosure which may be performed by an apparatus.

FIG. 7A illustrates operations which may be performed by a network device such as, but not limited to, an anchor user equipment (e.g., UE 5 and/or UE 10 as in FIG. 3). As shown in step 705 of FIG. 7A there is receiving, at a first user equipment from a network node of a communication network, configuration information comprising at least one configuration of sidelink positioning reference signal and at least one identifier of at least one radio beam, wherein the sidelink positioning reference signal is transmitted between the first user equipment and a second user equipment. As shown in step 710 of FIG. 7A there is receiving, from the second user equipment, a message comprising information for controlling a transmission of the sidelink positioning reference signal to the second user equipment. As shown in step 715 of FIG. 7A there is determining a configuration of the sidelink positioning reference signal to be transmitted to the second user equipment based at least on the information. Then as shown in step 720 of FIG. 7A there is transmitting, to the second user equipment, the sidelink positioning reference signal based at least on the determined configuration of the sidelink positioning reference signal.

In accordance with the example embodiments as described in the paragraph above, wherein the at least one configuration of the sidelink positioning reference signal corresponds to the at least one identifier of the at least one radio beam.

In accordance with the example embodiments as described in the paragraphs above, wherein the at least one configuration of the sidelink positioning reference signal comprises at least one of bandwidth, carrier frequency, periodicity and power for the transmission of the sidelink positioning reference signal.

In accordance with the example embodiments as described in the paragraphs above, wherein the at least one radio beam comprises at least one of: a downlink beam between the second user equipment and a base station, an uplink beam between the second user equipment and the base station, or a sidelink beam between the first user equipment and the second user equipment.

In accordance with the example embodiments as described in the paragraphs above, wherein the configuration information further comprises at least one index corresponding to the at least one configuration of the sidelink positioning reference signal.

In accordance with the example embodiments as described in the paragraphs above, wherein the information comprises at least one of: a first index corresponding to a configuration of the sidelink positioning reference signal selected by the second user equipment, a second index corresponding to a configuration of the sidelink positioning reference signal to be activated, or a third index corresponding to a configuration of the sidelink positioning reference signal to be deactivated.

In accordance with the example embodiments as described in the paragraph above, the first user equipment may determine the configuration of the sidelink positioning reference signal to be transmitted to the second user equipment by at least one of: selecting the configuration of the sidelink positioning reference signal corresponding to the first index, activating the configuration of the sidelink positioning reference signal corresponding to the second index, or deactivating the configuration of the sidelink positioning reference signal corresponding to the third index.

In accordance with the example embodiments as described in the paragraph above, the first user equipment may down-select a subset of the at least one configuration of the sidelink positioning reference signal.

In accordance with the example embodiments as described in the paragraph above, the first user equipment may transmit the subset of the at least of one configuration of the sidelink positioning reference signal to the second user equipment, and transmit the subset of the at least of one configuration of the sidelink positioning reference signal to the network node.

A non-transitory computer-readable medium (MEM 5B and/or MEM 10B as in FIG. 3) storing program code (PROG 5C and/or PROG 10C as in FIG. 3), the program code executed by at least one processor (DP 5A and/or DP 10A as in FIG. 3) to perform the operations as at least described in the paragraphs above.

In accordance with an example embodiment of the present disclosure as described above there is an apparatus comprising: means for receiving (TRANS 5D and/or TRANS 10D, MEM 5B and/or MEM 10B, PROG 5C and/or PROG 10C, and DP 5A and/or DP 10A as in FIG. 3), from a network node (NN 12 and/or NN 13 as in FIG. 3) of a communication network (Network 1 as in FIG. 3), configuration information comprising at least one configuration of sidelink positioning reference signal and at least one identifier of at least one radio beam, wherein the sidelink positioning reference signal is transmitted (TRANS 5D and/or TRANS 10D, MEM 5B and/or MEM 10B, PROG 5C and/or PROG 10C, and DP 5A and/or DP 10A as in FIG. 3) between a first user equipment (UE 5 and/or UE 10 as in FIG. 3) and a second user equipment (UE 5 and/or UE 10 as in FIG. 3); means for receiving (TRANS 5D and/or TRANS 10D, MEM 5B and/or MEM 10B, PROG 5C and/or PROG 10C, and DP 5A and/or DP 10A as in FIG. 3), from the second user equipment, a message comprising information for controlling a transmission of the sidelink positioning reference signal to the second user equipment; means for determining (TRANS 5D and/or TRANS 10D, MEM 5B and/or MEM 10B, PROG 5C and/or PROG 10C, and DP 5A and/or DP 10A as in FIG. 3) a configuration of the sidelink positioning reference signal to be transmitted to the second user equipment based at least on the information; and means for transmitting (TRANS 5D and/or TRANS 10D, MEM 5B and/or MEM 10B, PROG 5C and/or PROG 10C, and DP 5A and/or DP 10A as in FIG. 3), to the second user equipment, the sidelink positioning reference signal based at least on the determined configuration of the sidelink positioning reference signal.

In the example aspect of the present disclosure according to the paragraph above, wherein at least the means for receiving and means for determining and means for transmitting and/or sending comprises a non-transitory computer readable medium [MEM 5B and/or MEM 10B as in FIG. 3] encoded with a computer program [PROG 5C and/or PROG 10C as in FIG. 3] executable by at least one processor [DP 5A and/or DP 10A as in FIG. 3].

FIG. 7B illustrates operations which may be performed by a network device such as, but not limited to, a target user equipment (e.g., UE 5 and/or UE 10 as in FIG. 3). As shown in step 730 of FIG. 7B there is receiving, at a second user equipment from a network node, configuration information comprising at least one configuration of sidelink positioning reference signal and at least one identifier of at least one radio beam, wherein the sidelink positioning reference signal is transmitted between a first user equipment and the second user equipment. As shown in step 735 of FIG. 7B there is determining information for controlling a transmission of sidelink positioning reference signal from the first user equipment. As shown in step 740 of FIG. 7B there is transmitting, to the first user equipment, a message comprising the determined information. Then as shown in step 7645 of FIG. 7B there is receiving, from the first user equipment, the sidelink positioning reference signal.

In accordance with the example embodiments as described in the paragraph above, wherein the at least one configuration of the sidelink positioning reference signal corresponds to the at least one identifier of the at least one radio beam.

In accordance with the example embodiments as described in the paragraphs above, wherein the at least one configuration of the sidelink positioning reference signal comprises at least one of bandwidth, periodicity, carrier frequency and power for the transmission of the sidelink positioning reference signal.

In accordance with the example embodiments as described in the paragraphs above, wherein the at least one radio beam comprises at least one of: a downlink beam between the second user equipment and a base station, an uplink beam between the second user equipment and the base station, or a sidelink beam between the first user equipment and the second user equipment.

In accordance with the example embodiments as described in the paragraphs above, the second user equipment may measure at least one of: reference signal received power (RSRP) of the at least one radio beam, reference signal received quality (RSRQ) of the at least one radio beam, measured time of arrival (ToA), angle of departure (AoD), angle of arrival (AoA) with respect to at least one reference direction, or AoA with respect to another network node.

In accordance with the example embodiments as described in the paragraphs above, the second user equipment may determine the information based on at least a measurement result and the at least one configuration of the sidelink positioning reference signal.

In accordance with the example embodiments as described in the paragraphs above, wherein the configuration information further comprises at least one index corresponding to the at least one configuration of the sidelink positioning reference signal.

In accordance with the example embodiments as described in the paragraphs above, wherein the determined information comprises at least one of: a first index corresponding to a configuration of the sidelink positioning reference signal selected by the second user equipment, a second index corresponding to a configuration of the sidelink positioning reference signal to be activated, or a third index corresponding to a configuration of the sidelink positioning reference signal to be deactivated.

In accordance with the example embodiments as described in the paragraphs above, the second user equipment may receive a subset of the at least one configuration of the sidelink positioning reference signal from the first user equipment; and update the at least one configuration of the sidelink positioning reference signal based on the received subset of the at least of one configuration of the sidelink positioning reference signal.

A non-transitory computer-readable medium (MEM 5B and/or MEM 10B as in FIG. 3) storing program code (PROG 5C and/or PROG 10C as in FIG. 3), the program code executed by at least one processor (DP 5A and/or DP 10A as in FIG. 3) to perform the operations as at least described in the paragraphs above.

In accordance with an example embodiment of the present disclosure as described above there is an apparatus comprising: means for receiving (TRANS 5D and/or TRANS 10D, MEM 5B and/or MEM 10B, PROG 5C and/or PROG 10C, and DP 5A and/or DP 10A as in FIG. 3), from a network node (NN 12 and/or NN 13 as in FIG. 3), configuration information comprising at least one configuration of sidelink positioning reference signal and at least one identifier of at least one radio beam, wherein the sidelink positioning reference signal is transmitted between a first user equipment (UE 5 and/or UE 10 as in FIG. 3) and a second user equipment (UE 5 and/or UE 10 as in FIG. 3); means for determining (TRANS 5D and/or TRANS 10D, MEM 5B and/or MEM 10B, PROG 5C and/or PROG 10C, and DP 5A and/or DP 10A as in FIG. 3) information for controlling a transmission of sidelink positioning reference signal from the first user equipment; means for transmitting (TRANS 5D and/or TRANS 10D, MEM 5B and/or MEM 10B, PROG 5C and/or PROG 10C, and DP 5A and/or DP 10A as in FIG. 3), to the first user equipment, a message comprising the determined information; then means for receiving (TRANS 5D and/or TRANS 10D, MEM 5B and/or MEM 10B, PROG 5C and/or PROG 10C, and DP 5A and/or DP 10A as in FIG. 3), from the first user equipment, the sidelink positioning reference signal.

In the example aspect of the present disclosure according to the paragraph above, wherein at least the means for receiving and means for determining and means for transmitting comprises a non-transitory computer readable medium [MEM 5B and/or MEM 10B as in FIG. 3] encoded with a computer program [PROG 5C and/or PROG 10C as in FIG. 3] executable by at least one processor [DP 5A and/or DP 10A as in FIG. 3].

FIG. 7C illustrates operations which may be performed by a network device such as, but not limited to, a network node NN 12 and/or NN 13 and/or MME/SGW/UDM/PCF/AMF/SMF/LMF 14 as in FIG. 3. For example, the network device may be a gNB, an eNB or a LMF. As shown in step 750 of FIG. 7C there is determining by a network node of a communication network configuration information comprising at least one configuration of sidelink positioning reference signal and at least one identifier of at least one radio beam, wherein the at least one configuration of sidelink positioning reference signal is between a first user equipment and a second user equipment. Then as shown in step 755 of FIG. 7C there is transmitting the configuration information to the first user equipment and the second user equipment.

In accordance with the example embodiments as described in the paragraphs above, wherein the at least one configuration of the sidelink positioning reference signal corresponds to the at least one identifier of the at least one radio beam.

In accordance with the example embodiments as described in the paragraphs above, wherein the at least one configuration of the sidelink positioning reference signal comprises at least one of bandwidth, periodicity, carrier frequency and power for a transmission of the sidelink positioning reference signal.

In accordance with the example embodiments as described in the paragraphs above, wherein the at least one radio beam comprises at least one of a downlink beam between the second user equipment and a base station, an uplink beam between the second user equipment and the base station, or a sidelink beam between the first user equipment and the second user equipment.

In accordance with the example embodiments as described in the paragraphs above, wherein the configuration information further comprises at least one index corresponding to the at least one configuration of the sidelink positioning reference signal.

In accordance with the example embodiments as described in the paragraphs above, the network node may receive a subset of the at least of one configuration of the sidelink positioning reference signal from the first user equipment; and update the at least one configuration of the sidelink positioning reference signal based on the received subset of the at least of one configuration of the sidelink positioning reference signal.

A non-transitory computer-readable medium (MEM 12B and/or MEM 13B and/or MEM 14B as in FIG. 3) storing program code (PROG 12C and/or PROG 13C and/or PROG 14C as in FIG. 3), the program code executed by at least one processor (DP 12A and/or DP 13A and/or DP 14A as in FIG. 3) to perform the operations as at least described in the paragraphs above.

In accordance with an example embodiment of the present disclosure as described above there is an apparatus comprising: means for determining (TRANS 12D and/or TRANS 13D, MEM 12B and/or MEM 13B and/or MEM 14B, PROG 12C and/or PROG 13C, and/or PROG 14C, and DP 12A and/or DP 13A and/or DP 14A as in FIG. 3) by a network node (NN 12 and/or NN 13 and or MME/SGW/UDM/PCF/AMF/SMF/LMF 14 as in FIG. 3) of a communication network (Network 1 as in FIG. 3) configuration information comprising at least one configuration of sidelink positioning reference signal and at least one identifier of at least one radio beam, wherein the at least one configuration of sidelink positioning reference signal is between a first user equipment (UE 5 and/or UE 10 as in FIG. 3) and a second user equipment (UE 5 and/or UE 10 as in FIG. 3); then means for transmitting (TRANS 12D and/or TRANS 13D, MEM 12B and/or MEM 13B and/or MEM 14B, PROG 12C and/or PROG 13C and/or PROG 14C, and DP 12A and/or DP 13A and/or DP 14A as in FIG. 3) the configuration information to the first user equipment and the second user equipment.

In the example aspect of the present disclosure according to the paragraph above, wherein at least the means for determining and means for transmitting comprises a non-transitory computer readable medium [MEM 12B and/or MEM 13B and/or MEM 14B as in FIG. 3] encoded with a computer program [PROG 12C and/or PROG 13C and/or PROG 14C as in FIG. 3] executable by at least one processor [DP 12A and/or DP 13A and/or DP 14A as in FIG. 3].

It is submitted that some advantages of example embodiments of the present disclosure include at least:

Less interfacing among SL and UL/DL positioning signal transmissions and thus better positioning accuracy;

Less positioning latency; and

Less frequent higher layer signaling for positioning

Further, in accordance with example embodiments of the present disclosure there is circuitry for performing operations in accordance with example embodiments of the present disclosure as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the present disclosure as described herein.

In accordance with example embodiments of the present disclosure as disclosed in this application this application, the "circuitry" provided can include at least one or more or all of the following:

(a) hardware-only circuit implementations (such as implementations in only analog and/or digital circuitry);

(b) combinations of hardware circuits and software, such as (as applicable):

(i) a combination of analog and/or digital hardware circuit(s) with software/firmware; and (ii) any portions of hardware processor(s) with software (including digital signal processor(s)), software, and memory(ies) that work together to cause an apparatus, such as a mobile phone or server, to perform various functions, such as functions or operations in accordance with example embodiments of the present disclosure as disclosed herein); and (c) hardware circuit(s) and or processor(s), such as a microprocessor(s) or a portion of a microprocessor(s), that requires software (e.g., firmware) for operation, but the software may not be present when it is not needed for operation."

In accordance with example embodiments of the present disclosure, there is adequate circuitry for performing at least novel operations as disclosed in this application, this 'circuitry' as may be used herein refers to at least the following:

(a) hardware-only circuit implementations (such as implementations in only analog and/or digital circuitry); and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device. While various aspects of embodiments of the present disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the present disclosures may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" as may be used herein is to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the present disclosure and not to limit the scope of the appended claims.

The foregoing description has provided by way of exemplary and non-limiting examples a full and informative description of the best method and apparatus presently contemplated by the inventors for carrying out the present disclosure. However, various modifications and adaptations may become apparent to those skilled in the relevant arts in view of the foregoing description, when read in conjunction with the accompanying drawings and the appended claims. However, all such and similar modifications of the teachings of the present disclosure will still fall within the scope of the present disclosure.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of the present disclosure could be used to advantage without the corresponding use of other features. As such, the foregoing description should be considered as merely illustrative of the principles of the present disclosure, and not in limitation thereof.

What is claimed is:

1. A first user equipment comprising:

at least one processor; and at least one memory including computer program code, the at least one memory and the computer program code being configured to, with the at least one processor, cause the first user equipment to perform:

receiving, from a network node, configuration information comprising at least one configuration of sidelink positioning reference signal and at least one identifier of at least one radio beam, wherein the sidelink positioning reference signal is transmitted between the first user equipment and a second user equipment;

receiving, from the second user equipment, a message comprising information for controlling a transmission of the sidelink positioning reference signal to the second user equipment;

determining a configuration of the sidelink positioning reference signal to be transmitted to the second user equipment based at least on the information; and transmitting, to the second user equipment, the sidelink positioning reference signal based at least on the determined configuration of the sidelink positioning reference signal.

2. The first user equipment of claim 1, wherein the at least one configuration of the sidelink positioning reference signal corresponds to the at least one identifier of the at least one radio beam.

3. The first user equipment of claim 1, wherein the at least one configuration of the sidelink positioning reference signal comprises at least one of bandwidth, carrier frequency, periodicity and power for the transmission of the sidelink positioning reference signal.

4. The first user equipment of claim 1, wherein the at least one radio beam comprises at least one of:

a downlink beam between the second user equipment and a base station, an uplink beam between the second user equipment and the base station, or a sidelink beam between the first user equipment and the second user equipment.

5. The first user equipment of claim 1, wherein the configuration information further comprises at least one index corresponding to the at least one configuration of the sidelink positioning reference signal.

6. The first user equipment of claim 5, wherein the information comprises at least one of:

a first index corresponding to a configuration of the sidelink positioning reference signal selected by the second user equipment, a second index corresponding to a configuration of the sidelink positioning reference signal to be activated, or a third index corresponding to a configuration of the sidelink positioning reference signal to be deactivated.

7. The first user equipment of claim 6, wherein the at least one memory and the computer program code are configured to, with the at least one processor, cause the first user equipment to determine the configuration of the sidelink positioning reference signal to be transmitted to the second user equipment by at least one of:

selecting the configuration of the sidelink positioning reference signal corresponding to the first index, activating the configuration of the sidelink positioning reference signal corresponding to the second index, or deactivating the configuration of the sidelink positioning reference signal corresponding to the third index.

8. The first user equipment of claim 1, wherein the at least one memory and the computer program code are configured to, with the at least one processor, further cause the first user equipment to down-select a subset of the at least one configuration of the sidelink positioning reference signal.

9. The first user equipment of claim 8, wherein the at least one memory and the computer program code are configured to, with the at least one processor, further cause the first user equipment to:

transmit the subset of the at least of one configuration of the sidelink positioning reference signal to the second user equipment, and transmit the subset of the at least of one configuration of the sidelink positioning reference signal to the network node.

10. A second user equipment comprising:

at least one processor; and at least one memory including computer program code, the at least one memory and the computer program code being configured to, with the at least one processor, cause the second user equipment to perform:

receiving, from a network node, configuration information comprising at least one configuration of sidelink positioning reference signal and at least one identifier of at least one radio beam, wherein the sidelink positioning reference signal is transmitted between a first user equipment and the second user equipment;

determining information for controlling a transmission of sidelink positioning reference signal from the first user equipment;

transmitting, to the first user equipment, a message comprising the determined information; and receiving, from the first user equipment, the sidelink positioning reference signal.

11. The second user equipment of claim 10, wherein the at least one configuration of the sidelink positioning reference signal corresponds to the at least one identifier of the at least one radio beam.

12. The second user equipment of claim 10, wherein the at least one configuration of the sidelink positioning reference signal comprises at least one of bandwidth, periodicity, carrier frequency and power for the transmission of the sidelink positioning reference signal.

13. The second user equipment of claim 10, wherein the at least one radio beam comprises at least one of:

a downlink beam between the second user equipment and a base station, an uplink beam between the second user equipment and the base station, or a sidelink beam between the first user equipment and the second user equipment.

14. The second user equipment of claim 10, wherein the at least one memory and the computer program code are configured to, with the at least one processor, further cause the second user equipment to measure at least one of:

reference signal received power (RSRP) of the at least one radio beam, reference signal received quality (RSRQ) of the at least one radio beam, measured time of arrival (ToA), angle of departure (AoD), angle of arrival (AoA) with respect to at least one reference direction, or AoA with respect to another network node.

15. The second user equipment of claim 14, wherein the at least one memory and the computer program code are configured to, with the at least one processor, cause the first user equipment to determine the information based on at least a measurement result and the at least one configuration of the sidelink positioning reference signal.

16. The second user equipment of claim 10, wherein the configuration information further comprises at least one index corresponding to the at least one configuration of the sidelink positioning reference signal.

17. The second user equipment of claim 16, wherein the determined information comprises at least one of:

a first index corresponding to a configuration of the sidelink positioning reference signal selected by the second user equipment, a second index corresponding to a configuration of the sidelink positioning reference signal to be activated, or a third index corresponding to a configuration of the sidelink positioning reference signal to be deactivated.

18. The second user equipment of claim 10, wherein the at least one memory and the computer program code are configured to, with the at least one processor, further cause the second user equipment to:

receive a subset of the at least one configuration of the sidelink positioning reference signal from the first user equipment; and update the at least one configuration of the sidelink positioning reference signal based on the received subset of the at least of one configuration of the sidelink positioning reference signal.

19. A network node of a communication network, comprising:

at least one processor; and at least one memory including computer program code, the at least one memory and the computer program code being configured to, with the at least one processor, cause the network node to perform:

determining configuration information comprising at least one configuration of sidelink positioning reference signal and at least one identifier of at least one radio beam, wherein the at least one configuration of sidelink positioning reference signal is between a first user equipment and a second user equipment; and transmitting the configuration information to the first user equipment and the second user equipment, wherein the configuration information further causes the second user equipment to determine information for controlling a transmission of sidelink positioning reference signal from the first user equipment.

20. The network node of claim 19, wherein the at least one configuration of the sidelink positioning reference signal corresponds to the at least one identifier of the at least one radio beam.

21. The network node of claim 19, wherein the at least one configuration of the sidelink positioning reference signal comprises at least one of bandwidth, periodicity, carrier frequency and power for a transmission of the sidelink positioning reference signal.

22. The network node of claim 19, wherein the at least one radio beam comprises at least one of:

a downlink beam between the second user equipment and a base station, an uplink beam between the second user equipment and the base station, or a sidelink beam between the first user equipment and the second user equipment.

23. The network node of claim 19, wherein the configuration information further comprises at least one index corresponding to the at least one configuration of the sidelink positioning reference signal.

24. The network node of claim 19, wherein the at least one memory and the computer program code are configured to, with the at least one processor, further cause the network node to:

receive a subset of the at least of one configuration of the sidelink positioning reference signal from the first user equipment, and update the at least one configuration of the sidelink positioning reference signal based on the received subset of the at least of one configuration of the sidelink positioning reference signal.

* * * * *